United States Patent
Kim et al.

(10) Patent No.: US 9,923,462 B2
(45) Date of Patent: Mar. 20, 2018

(54) DC-DC CONVERTER AND DRIVING METHOD THEREOF

(71) Applicant: Samsung Display Co., Ltd., Yongin-si, Gyeonggi-do (KR)

(72) Inventors: Kyun Ho Kim, Yongin-si (KR); Min Ho Park, Yongin-si (KR); Yoon Sik Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/157,266

(22) Filed: May 17, 2016

(65) Prior Publication Data

US 2017/0033692 A1 Feb. 2, 2017

(30) Foreign Application Priority Data

Jul. 28, 2015 (KR) .......................... 10-2015-0106659

(51) Int. Cl.
  *H02M 3/158* (2006.01)
  *H02M 1/32* (2007.01)
  *H02M 3/157* (2006.01)

(52) U.S. Cl.
  CPC ............ *H02M 3/158* (2013.01); *H02M 1/32* (2013.01); *H02M 3/157* (2013.01); *H02M 3/1588* (2013.01); *Y02B 70/1466* (2013.01)

(58) Field of Classification Search
  CPC .... H02M 3/1588; H02M 3/156; H02M 3/158; H02M 3/1582; H02M 3/1584; H02M 3/157; H02M 3/33507; H02M 2001/0012; H02M 2001/0032; H02M 2001/0009; Y02B 70/1466; G01R 17/00; G01R 27/02; G01L 9/10; G01D 5/202; G01D 5/22
  (Continued)

(56) References Cited

U.S. PATENT DOCUMENTS 5,687,066 A    11/1997  Cook, II
2003/0076079 A1  4/2003  Alcantar et al.
(Continued)

FOREIGN PATENT DOCUMENTS

KR  10-2012-0010583   2/2012
KR  10-2013-0123230  11/2013
KR  10-2014-0086823   7/2014

OTHER PUBLICATIONS

EPO Extended Search Report dated Dec. 13, 2016, for corresponding European Patent Application No. 16181326.6 (9 pages).

*Primary Examiner* — Jue Zhang
*Assistant Examiner* — Kevin H Sprenger
(74) *Attorney, Agent, or Firm* — Lewis Roca Rothgerber Christie LLP (57) ABSTRACT

A DC-DC converter includes: a switching circuit to change a voltage value of an input voltage, and to generate an output voltage; a feedback circuit connected between an output terminal to which the output voltage is supplied and a source of a first power, and to generate a feedback voltage corresponding to the output voltage; a gate pulse generator to generate a gate pulse to be supplied to the switching circuit by utilizing the feedback voltage; a current protector to control the switching circuit by utilizing the feedback voltage and the gate pulse; and a voltage protector to control the switching circuit by utilizing the feedback voltage.

14 Claims, 4 Drawing Sheets

(58) Field of Classification Search
USPC .................................. 323/271, 282–285, 363
See application file for complete search history.

(56) References Cited

U.S. PATENT DOCUMENTS

| | | | |
|---|---|---|---|
| 2007/0018618 A1* | 1/2007 | Endo .................... | H02M 3/1588 |
| | | | 323/224 |
| 2007/0236191 A1* | 10/2007 | Yu ........................ | H02M 3/1588 |
| | | | 323/282 |
| 2009/0285003 A1 | 11/2009 | Ishii | |
| 2010/0123978 A1 | 5/2010 | Lin et al. | |
| 2012/0013266 A1 | 1/2012 | Jeon et al. | |
| 2013/0293109 A1 | 11/2013 | Cheon et al. | |
| 2013/0328534 A1* | 12/2013 | Hsieh ........................ | G05F 3/02 |
| | | | 323/271 |
| 2014/0184095 A1 | 7/2014 | Yoshinaga et al. | |

\* cited by examiner

DC-DC CONVERTER AND DRIVING METHOD THEREOF

CROSS-REFERENCE TO RELATED APPLICATION

This application claims priority to and the benefit of Korean Patent Application No. 10-2015-0106659, filed on Jul. 28, 2015, in the Korean Intellectual Property Office, the content of which is incorporated herein by reference in its entirety.

BACKGROUND

1. Field

One or more aspects of example embodiments of the present invention relate to a DC-DC converter and a driving method thereof.

2. Description of the Related Art

As information technology develops, the importance of a display apparatus, which is a connection media between information and users, is being emphasized. Accordingly, the use of the display apparatus, such as a liquid crystal display device and/or an organic light emitting display device, has increased.

The display apparatus includes pixels located at crossing regions of scan lines and data lines, a scan driver to drive the scan lines, and a data driver to drive the data lines.

The display apparatus includes a DC-DC converter to generate a voltage for driving the display apparatus. The DC-DC converter is a device for converting the voltage by using an energy storage device, such as an inductor, etc. In other words, the DC-DC converter generates the voltage by a step-up or a step-down of an input voltage, and supplies the generated voltage as an output voltage.

The DC-DC converter includes a current protection part to prevent or reduce damage to components caused by high current. The current protection part connects a plurality of resistors in series, and controls the operation of the DC-DC converter corresponding to an amount of the current (e.g., a current value) that flows into the resistors connected in series.

In other words, the current protection part detects the voltage applied to the resistors corresponding to the current value, and controls the operation of the DC-DC converter corresponding to the detected voltage. However, when a plurality of resistors is connected in series, high heat may be generated, and high power consumption may occur. Further, it may be difficult to prevent or reduce the damage to components caused by an instant current increase, since a voltage value applied to the resistors is set considering an operation margin.

The above information disclosed in this Background section is for enhancement of understanding of the background of the present invention, and therefore, it may contain information that does not constitute prior art.

SUMMARY

One or more example embodiments of the present invention are directed toward a DC-DC converter to prevent or reduce damage to components thereof by current, and a driving method thereof.

According to an embodiment of the present invention, a DC-DC converter includes: a switching circuit configured to change a voltage value of an input voltage, and to generate an output voltage; a feedback circuit connected between an output terminal to which the output voltage is supplied and a source of a first power, and configured to generate a feedback voltage corresponding to the output voltage; a gate pulse generator configured to generate a gate pulse to be supplied to the switching circuit by utilizing the feedback voltage; a current protector configured to control the switching circuit by utilizing the feedback voltage and the gate pulse; and a voltage protector configured to control the switching circuit by utilizing the feedback voltage.

The switching circuit may include a first transistor, an inductor, a diode, and a second transistor, the first transistor, the inductor, and the diode may be connected between an input terminal to which the input voltage is input and the output terminal, and the second transistor may be connected between a first node and the source of the first power, the first node being a common node of the inductor and the diode.

The current protector may be configured to turn off the first transistor when the feedback voltage is lower than a first reference voltage and when a DC voltage corresponding to the gate pulse is higher than a second reference voltage.

The current protector may include: a first comparator configured to compare the feedback voltage with the first reference voltage, and to generate a first control signal when the first reference voltage is higher than the feedback voltage; a DC converter configured to convert the gate pulse to the DC voltage; a second comparator configured to compare the DC voltage with the second reference voltage, and to generate a second control signal when the DC voltage is higher than the second reference voltage; a logic gate configured to output a current protection signal when the first control signal and the second control signal are input thereto; and a current protection transistor connected between a gate electrode of the first transistor and the source of the first power, a gate electrode of the current protection transistor being connected to the logic gate.

The current protection transistor may be configured to be turned off when the current protection signal is supplied.

The DC-DC converter may further include an inverter connected between the logic gate and the current protection transistor.

The current protection transistor may be configured to be turned off when the current protection signal that is inverted from the inverter is supplied thereto.

The logic gate may include an AND gate.

The DC converter may include an integrator including a resistor and a capacitor.

The voltage protector may include: a voltage protection transistor connected between a gate electrode of the second transistor and the source of the first power, and configured to turn off the second transistor when a voltage protection signal is supplied thereto; and a comparator configured to compare the feedback voltage with a third reference voltage, and to provide the voltage protection signal when the feedback voltage is higher than the third reference voltage.

A voltage value of the first power may be lower than those of the input voltage and the output voltage.

The first power may be a base power (GND).

The feedback circuit may include a first resistor and a second resistor connected between the output terminal and the source of the first power, and a voltage of a common terminal between the first resistor and the second resistor may be the feedback voltage.

According to an embodiment of the present invention, a driving method of a DC-DC converter including a first transistor, an inductor, a diode, and a second transistor, the first transistor, the inductor, and the diode being connected between an input terminal and an output terminal, the second transistor being connected between a first node and a source of a first power, and the first node being a common node of the inductor and the diode, includes: generating a gate pulse to control the second transistor by utilizing a feedback voltage corresponding to an output voltage supplied to the output terminal; and controlling the first transistor to be turned on or off corresponding to the gate pulse and the feedback voltage.

The generating of the gate pulse may include controlling a duty ratio of the gate pulse to maintain a constant level of the feedback voltage.

The controlling of the first transistor may include: comparing the feedback voltage with a first reference voltage and generating a first control signal when the first reference voltage is higher than the feedback voltage; converting the gate pulse into a DC voltage; comparing the DC voltage with a second reference voltage and generating a second control signal when the DC voltage is higher than the second reference voltage; and turning off the first transistor when the first control signal and the second control signal are generated.

BRIEF DESCRIPTION OF THE DRAWINGS

The above and other aspects and features of the present invention will become apparent to those skilled in the art from the following detailed description of the example embodiments with reference to the accompanying drawings, in which like reference numerals refer to like elements throughout.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Figure 1:
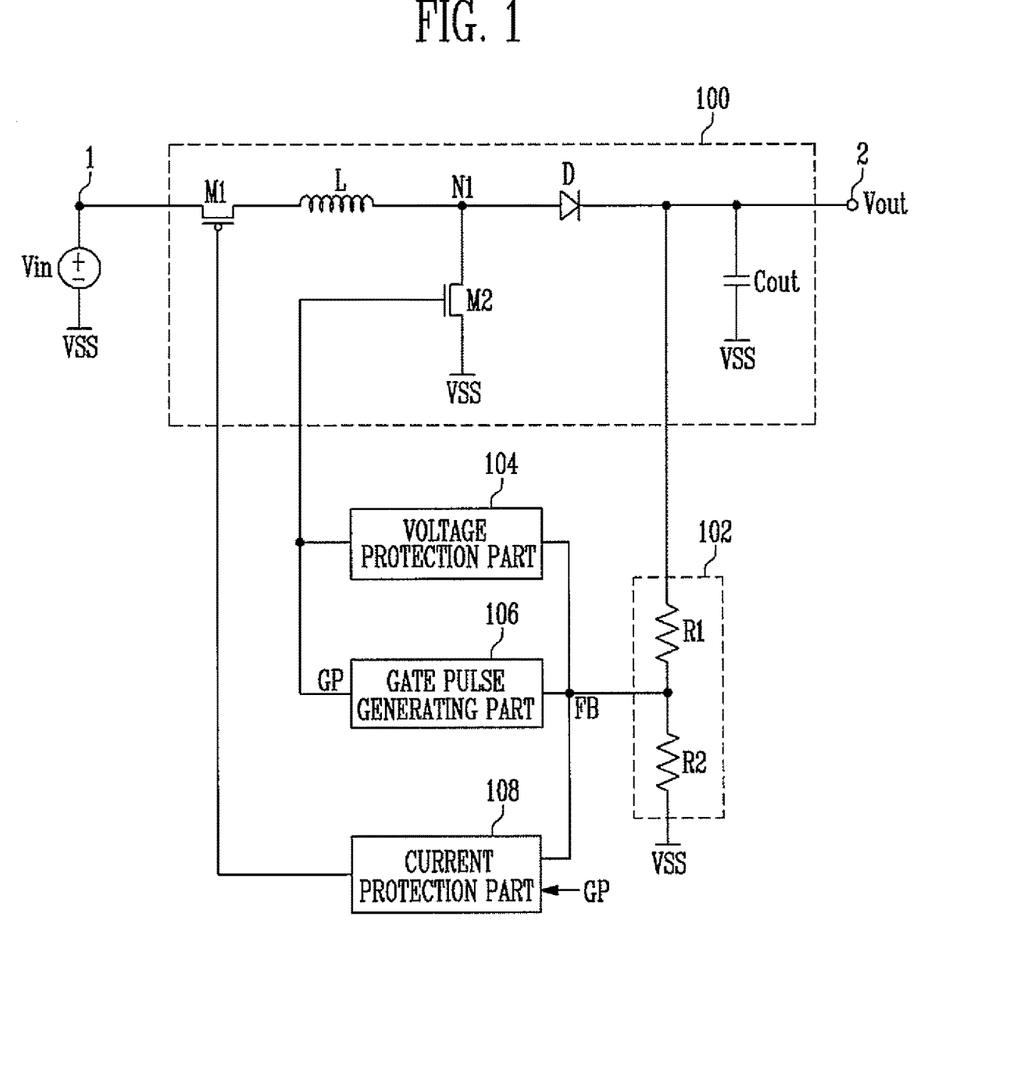
FIG. 1 illustrates a DC-DC converter according to an embodiment of the present invention.

FIG. 1 illustrates a DC-DC converter according to an embodiment of the present invention.

Referring to FIG. 1, a DC-DC converter according to an embodiment of the present invention may include a switching part (e.g., a switching circuit) 100, a feedback part (e.g., a feedback circuit) 102, a voltage protection part (e.g., a voltage protector) 104, a gate pulse generation part (e.g., a gate pulse generator) 106, and a current protection part (e.g., a current protector) 108.

The switching part 100 may generate an output voltage Vout by changing a voltage value of an input voltage Vin corresponding to a gate pulse GP supplied from the gate pulse generation part 106. The switching part 100 may include a first transistor M1, an inductor L, a diode D, a second transistor M2, and an output capacitor Cout. The inductor L and the diode D may be connected between an input terminal 1 and an output terminal 2. The second transistor M2 may be connected between a first node N1, which is a common node of the inductor L and the diode D, and a first power VSS (e.g., a source of a first power or a first power source). The output capacitor Cout may be connected between the output terminal 2 and the first power VSS.

The first transistor M1 may be connected between the input terminal 1 to which the input voltage Vin is supplied and the inductor L. Further, a gate electrode of the first transistor M1 may be connected to the current protection part 108.

The first transistor M1 may be turned on or off corresponding to the control of the current protection part 108. When the first transistor 1 M1 is turned on, the input voltage Vin may be supplied to the inductor L, so that the DC-DC converter may be driven normally. When the first transistor M1 is turned off, the input voltage Vin may not be supplied to the inductor L, so that the DC-DC converter may not generate the output voltage Vout. The first transistor M1 may include (e.g., be implemented as or formed of) a PMOS transistor, but the present invention is not limited thereto.

The inductor L may be connected between the first transistor M1 and the first node N1. The inductor L may charge electric energy corresponding to the current value.

The diode D may be connected between the first node N1 and the output terminal 2. The diode D may transmit the energy charged in the inductor L to the output terminal 2, and may prevent or substantially prevent the output voltage Vout from being supplied to the inductor L. That is, the diode D may be connected so that the current flows from the first node N1 to the output terminal 2.

The second transistor M2 may be connected between the first node N1 and the first power VSS. The second transistor M2 may be turned on or off corresponding to the gate pulse GP supplied from the gate pulse generation part 106. When the second transistor M2 is turned on or off, the electric energy may be charged in the inductor L corresponding to the current flowing in the inductor L. Additionally, the first power VSS may be set as a lower voltage than those of the input voltage Vin and the output voltage Vout. For example, the first power VSS may be set as a base power GND. Further, the second transistor M2 may include (e.g., be implemented as or formed of) an NMOS transistor, but the present invention is not limited thereto.

The output capacitor Cout may be connected between the output terminal 2 and the first power VSS. The output capacitor Cout may store the electric energy supplied from the diode D, and may supply the stored electric energy to the output terminal 2 as the output voltage Vout.

The feedback part 102 may divide the output voltage Vout, and may output a feedback voltage FB accordingly. The feedback part 102 may include a first resistor R1 and a second resistor R2 connected between the output terminal 2 and the first power VSS. The feedback voltage FB that is generated by dividing the output voltage Vout may be applied to a common node between the first resistor R1 and the second resistor R2.

Figure 2A:
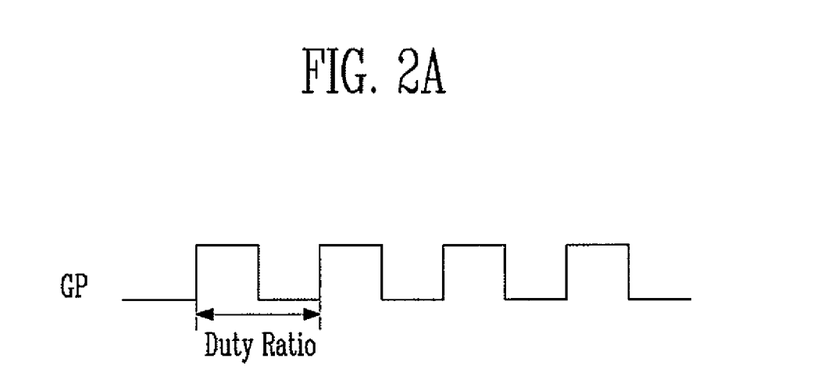
FIGS. 2A-2B illustrate gate pulses generated in a gate pulse generation part as shown in FIG. 1, according to an embodiment of the present invention.
Figure 2B:
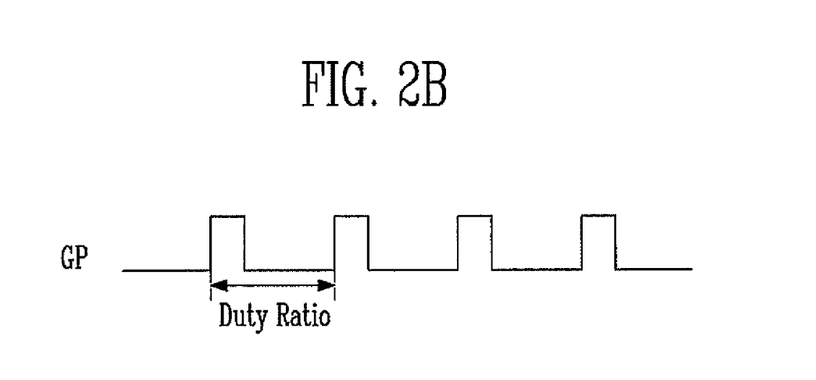

The gate pulse generation part 106 may generate the gate pulse GP using the feedback voltage FB, a reference voltage, and a ramp waveform (for example, a triangular wave). For example, the gate pulse generation part 106 may generate the gate pulse GP with increased duty ratio as shown in FIG. 2A, when the feedback voltage FB decreases. Further, for example, the gate pulse generation part 106 may generate the gate pulse GP with decreased duty ratio as shown in FIG. 2B, when the feedback voltage FB increases.

When the duty ratio of the gate pulse GP increases, the turn on time of the second transistor M2 may increase, and the voltage value of the output voltage Vout may increase. When the duty ratio of the gate pulse GP decreases, the turn on time of the second transistor M2 may decrease, and the voltage value of the output voltage Vout may decrease. In other words, the gate pulse generation part 106 may control the duty ratio of the gate pulse GP corresponding to the feedback voltage FB to maintain or substantially maintain the output voltage Vout to have a constant or substantially constant level.

As described above, the gate pulse generation part 106 may generate the gate pulse GP corresponding to the feedback voltage FB. The gate pulse generation part 106 may be implemented in various suitable circuits as would be apparent to those skilled in the art.

The voltage protection part 104 may control the second transistor M2 to be turned on or off corresponding to the feedback voltage FB. For example, the voltage protection part 104 may turn off the second transistor M2 when the feedback voltage FB is higher than a third reference voltage (e.g., a pre-set third reference voltage) Vref 3. The voltage protection part 104 may be used to stop the operation of the DC-DC converter when the output voltage Vout increases abnormally.

The current protection part 108 may control the first transistor M1 to be turned on or off corresponding to the feedback voltage FB and the gate pulse GP. The current protection part 108 may turn off the first transistor M1 when the current flowing into the second transistor M2 increases abnormally. When the first transistor M1 is turned off, the operation of the DC-DC converter may stop.

Figure 3:
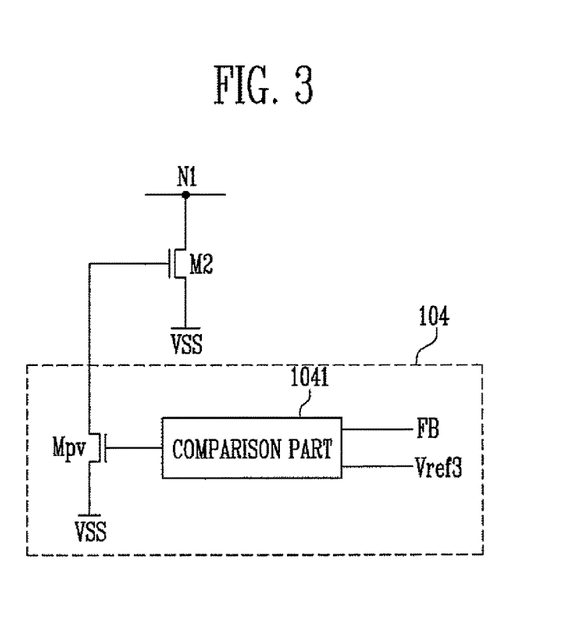
FIG. 3 illustrates a voltage protection part as shown in FIG. 1, according to an embodiment of the present invention.

FIG. 3 illustrates a voltage protection part as shown in FIG. 1, according to an embodiment of the present invention.

Referring to FIG. 3, a voltage protection part (e.g., a voltage protector) 104 according to an embodiment of the present invention may include a comparison part (e.g., a comparator) 1041 and a voltage protection transistor Mpv. The voltage protection transistor Mpv may be connected between the gate electrode of the second transistor M2 and the first power VSS. The voltage protection transistor Mpv may be turned on when a voltage protection signal (for example, a high voltage) is supplied from the comparison part 1041. When the voltage protection transistor Mpv is turned on, the first power VSS may be supplied to the gate electrode of the second transistor M2, and the second transistor M2 may be turned off regardless of the gate pulse GP.

The comparison part 1041 may receive the feedback voltage FB and the third reference voltage Vref3. The comparison part 1041 may output the voltage protection signal when the feedback voltage FB is higher than the third reference voltage Vref3. The third reference voltage Vref3 may have a voltage value to determine the abnormal voltage, and thus, may have a suitable value (e.g., set to a suitable predetermined value) for determining the abnormal voltage.

Figure 4:
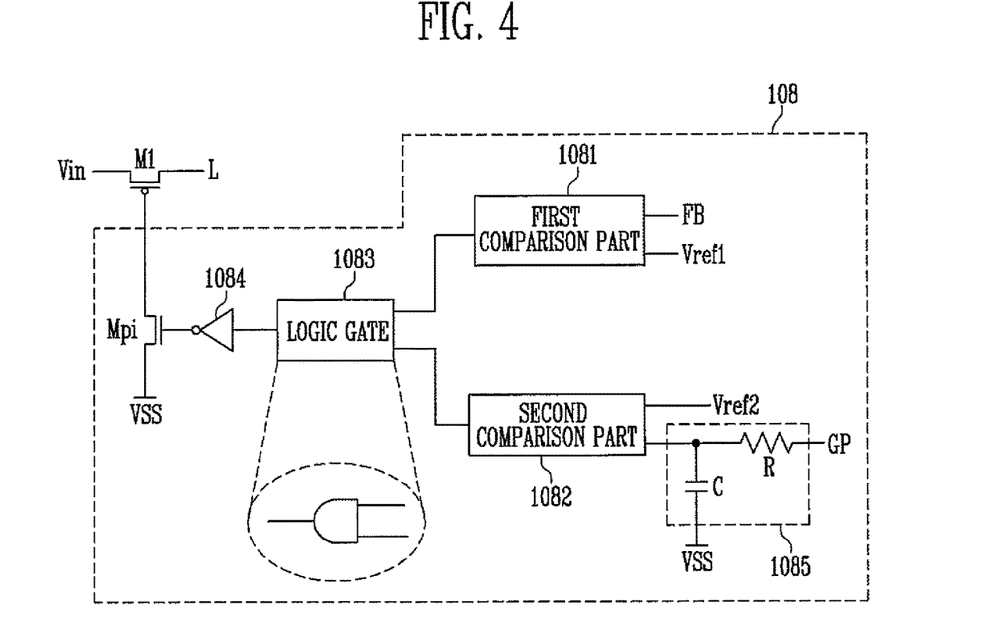
FIG. 4 illustrates a current protection part as shown in FIG. 1, according to an embodiment of the present invention.

FIG. 4 illustrates a current protection part (e.g., a current protector) as shown in FIG. 1, according to an embodiment of the present invention.

Referring to FIG. 4, the current protection part 108 according to an embodiment of the present invention may include a first comparison part (e.g., a first comparator) 1081, a second comparison part (e.g., a second comparator) 1082, a logic gate 1083, an inverter 1084, a DC voltage converting part (e.g., a DC voltage converter) 1085, and a current protection transistor Mpi.

The current protection transistor Mpi may be connected between the gate electrode of the first transistor M1 and the first power VSS. Further, a gate electrode of the current protection transistor Mpi may be connected to the logic gate 1083 via the inverter 1084. The current protection transistor Mpi may be turned off when an inverted current protection signal (for example, a low voltage) is supplied from the inverter 1084. When the current protection transistor Mpi is turned off, a voltage of the first power VSS may not be supplied to the gate electrode of the first transistor M1, so that the first transistor M1 may be turned off. When the first transistor M1 is turned off, the operation of a DC-DC converter may stop.

The first comparison part 1081 may receive the feedback voltage FB and a first reference voltage Vref1. The first comparison part 1081 may output a first control signal (for example, a high voltage) when the first reference voltage Vref1 is higher than the feedback voltage FB.

In more detail, the feedback voltage FB may drop to the voltage of the second power VSS (for example, GND) in abnormal cases, for example, when the diode D is damaged and/or the output terminal 2 is short-circuited with the second power VSS. The first comparison part 1081 may output the first control signal corresponding to the abnormal status of the feedback voltage FB. The first reference voltage Vref1 may have a higher voltage than that of the second power VSS corresponding to the abnormal status of the feedback voltage FB.

The DC voltage converting part 1085 may convert the gate pulse GP to a DC voltage. The DC voltage converting part 1085 may include an integrator including a resistor R and a capacitor C.

The second comparison part 1082 may receive the DC voltage from the DC voltage converting part 1085 and a second reference voltage Vref2. The second comparison part 1082 may output a second control signal (for example, a high voltage) when the DC voltage is higher than the second reference voltage Vref2.

In more detail, when the feedback voltage FB decreases, the duty ratio of the gate pulse GP may increase to raise the feedback voltage FB (for example, the duty ratio of the gate pulse GP may increase to a full duty). Then, the turn on time of the second transistor M2 may increase, so that a high current may flow to the second transistor M2. When the duty ratio of the gate pulse GP increases, the DC voltage from the DC voltage converting part 1085 may be higher than that of the second reference voltage Vref2, so that the second comparison part 1082 may output the second control signal. A level of the second reference voltage Vref2 may be determined in advance corresponding to a duty ratio (e.g., a predetermined duty ratio) of the gate pulse GP.

The logic gate 1083 may output a current protection signal when the first control signal and the second control signal are input. In other words, the logic gate 1083 may output the current protection signal when the feedback voltage FB abnormally decreases, and concurrently (e.g., simultaneously), when the duty ratio of the gate pulse GP increases higher than that set previously (e.g., when the duty ratio of the gate pulse GP exceeds the predetermined duty ratio). The logic gate 1083 may include (e.g., be implemented as) an AND GATE.

The inverter 1084 may invert the current protection signal, and may supply the inverted current protection signal to the current protection transistor Mpi. The current protection transistor Mpi which receives the inverted current protection signal may be turned off, so that the first transistor M1 may be turned off.

As described above, the current protection part 108 according to an embodiment of the present invention may stop an operation of the DC-DC converter by turning off the first transistor M1, when the overcurrent flows to the DC-DC converter (e.g., when the feedback voltage FB decreases abnormally and the duty ratio of the gate pulse GP increases higher than that set previously). Further, the current protection part 108 according to an embodiment of the present invention may set a response speed by the resistor R and the capacitor C included in the DC voltage converting part 1085 to control a time constant.

Figure 5:
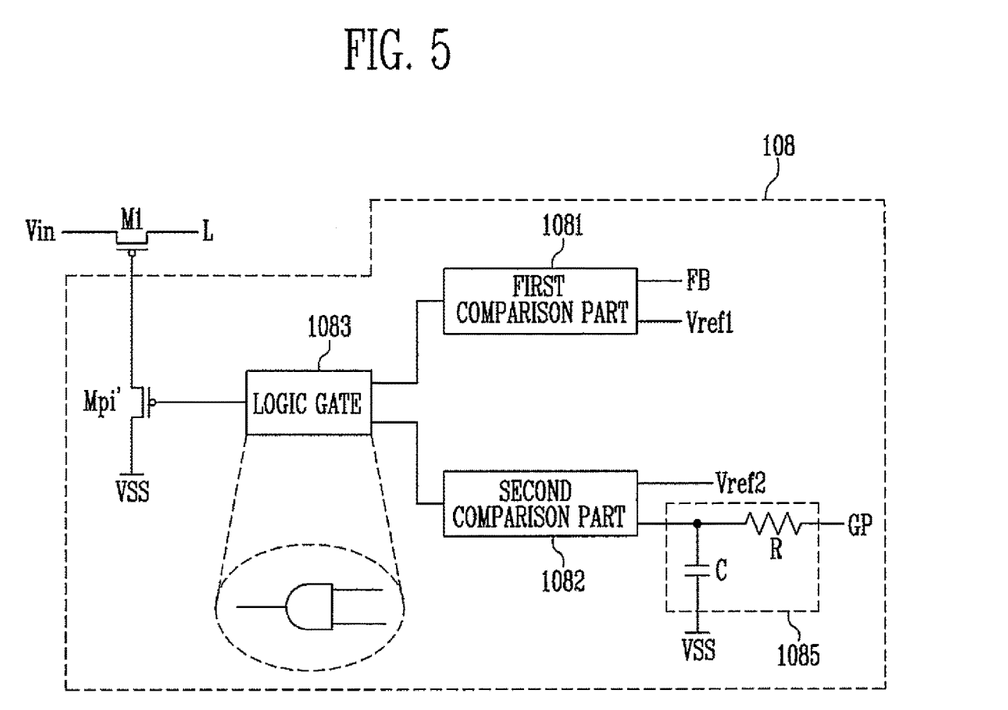
FIG. 5 illustrates a current protection part as shown in FIG. 1, according to another embodiment of the present invention.

FIG. 5 illustrates a current protection part (e.g., a current protector) as shown in FIG. 1, according to another embodiment of the present invention.

Referring to FIG. 5, elements having the same reference numerals as those in FIG. 4 represent like elements, and thus, repeat description thereof may be omitted.

Referring to FIG. 5, the current protection part 108 according to another embodiment of the present invention may operate in the same or substantially the same manner as that of the current protection part 108 in FIG. 4.

However, the current protection transistor Mpi' in the current protection part 108 of FIG. 5 may include (e.g., be implemented as or formed as) a PMOS transistor, so that the inverter 1084 may be omitted. Thus, the current protection transistor Mpi' may be turned off when a current protection signal is supplied from the logic gate 1083. A detailed description thereof will be omitted, since the driving method is the same or substantially the same as that of FIG. 4.

According to one or more example embodiments of the present invention, a DC-DC converter and a driving method thereof may stop a driving of the DC-DC converter when current increases (e.g., increases rapidly). For example, an electrical connection of an inverter and an input voltage may be shut off (e.g., disconnected) when the feedback voltage is lower than a first reference value and the voltage of the gate pulse increases above a second reference value (e.g., simultaneously or concurrently). Further, since the increase (e.g., rapid increase) of the current may be detected using a comparator and a logic gate, the reliability of an operation may be obtained.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although example embodiments of the present invention have been described, it will be understood that the present invention is not limited to these example embodiments, and that various changes and modifications may be made as understood by those of ordinary skilled in the art within the spirit and scope of the present invention as defined in the following claims, and their equivalents.

What is claimed is:

1. A DC-DC converter, comprising:
   a switching circuit configured to change a voltage value of an input voltage, and to generate an output voltage;
   a feedback circuit connected between an output terminal to which the output voltage is supplied and a source of a first power, and configured to generate a feedback voltage corresponding to the output voltage;
   a gate pulse generator configured to generate a gate pulse to be supplied to the switching circuit by utilizing the feedback voltage;
   a current protector configured to receive the feedback voltage and to control the switching circuit by utilizing the feedback voltage and the gate pulse; and
   a voltage protector configured to control the switching circuit by utilizing the feedback voltage,
   wherein the current protector comprises a first comparator configured to receive the feedback voltage and to compare the feedback voltage with a first reference voltage, and
   the voltage protector comprises a comparator configured to receive the feedback voltage and to compare the feedback voltage with a third reference voltage.

2. The DC-DC converter of claim 1, wherein the switching circuit comprises a first transistor, an inductor, a diode, and a second transistor,
   wherein the first transistor, the inductor, and the diode are connected between an input terminal to which the input voltage is input and the output terminal, and
   wherein the second transistor is connected between a first node and the source of the first power, the first node being a common node of the inductor and the diode.

3. The DC-DC converter of claim 2, wherein the current protector is configured to turn off the first transistor when the feedback voltage is lower than a first reference voltage and when a DC voltage corresponding to the gate pulse is higher than a second reference voltage.

4. The DC-DC converter of claim 3, wherein the current protector further comprises:
   a DC converter configured to convert the gate pulse to the DC voltage;
   a second comparator configured to compare the DC voltage with the second reference voltage, and to generate a second control signal when the DC voltage is higher than the second reference voltage;
   a logic gate configured to output a current protection signal when a first control signal and the second control signal are input thereto; and
   a current protection transistor connected between a gate electrode of the first transistor and the source of the first power, a gate electrode of the current protection transistor being connected to the logic gate,
   wherein the first comparator is configured to generate the first control signal when the first reference voltage is higher than the feedback voltage.

5. The DC-DC converter of claim 4, wherein the current protection transistor is configured to be turned off when the current protection signal is supplied.

6. The DC-DC converter of claim 4, further comprising an inverter connected between the logic gate and the current protection transistor.

7. The DC-DC converter of claim 6, wherein the current protection transistor is configured to be turned off when the current protection signal that is inverted from the inverter is supplied thereto.

8. The DC-DC converter of claim 4, wherein the logic gate comprises an AND gate.

9. The DC-DC converter of claim 4, wherein the DC converter comprises an integrator comprising a resistor and a capacitor.

10. The DC-DC converter of claim 2, wherein the voltage protector further comprises:
    a voltage protection transistor connected between a gate electrode of the second transistor and the source of the first power, and configured to turn off the second transistor when a voltage protection signal is supplied thereto,
    wherein the comparator is configured to provide the voltage protection signal when the feedback voltage is higher than the third reference voltage.

11. The DC-DC converter of claim 1, wherein a voltage value of the first power is lower than those of the input voltage and the output voltage.

12. The DC-DC converter of claim 11, wherein the first power is a base power (GND).

13. The DC-DC converter of claim 1, wherein the feedback circuit comprises a first resistor and a second resistor connected between the output terminal and the source of the first power, and
    wherein a voltage of a common terminal between the first resistor and the second resistor is the feedback voltage.

14. A DC-DC converter, comprising:
    a switching circuit including a first transistor, an inductor, a diode, and a second transistor;
    a feedback circuit connected between an output terminal to which an output voltage is supplied and a source of a first power, and configured to generate a feedback voltage corresponding to the output voltage;

a gate pulse generator configured to generate a gate pulse to be supplied to the switching circuit by utilizing the feedback voltage;

a current protector configured to control the switching circuit; and a voltage protector configured to control the switching circuit, wherein the first transistor, the inductor, and the diode are connected between an input terminal to which an input voltage is input and the output terminal, wherein the second transistor is connected between a first node and the source of the first power, the first node being a common node of the inductor and the diode, wherein the current protector is configured to turn off the first transistor when the feedback voltage is lower than a first reference voltage and when a DC voltage corresponding to the gate pulse is higher than a second reference voltage, and wherein the voltage protector is configured to turn off the second transistor when the feedback voltage is higher than a third reference voltage.

* * * * *